(12) United States Patent
Akhond et al.

(10) Patent No.: US 6,173,337 B1
(45) Date of Patent: *Jan. 9, 2001

(54) METHOD AND APPARATUS FOR RELAYING EVENTS INTENDED FOR A FIRST APPLICATION PROGRAM TO A SECOND APPLICATION PROGRAM

(75) Inventors: Hossein David Akhond, Santa Clara; Gregory George Scown, Sunnyvale; Johnathon Paul Kaminar, Santa Clara, all of CA (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/613,186

(22) Filed: Mar. 8, 1996

(51) Int. Cl.⁷ .............................. G06F 9/00; G06F 9/46; G06F 15/163
(52) U.S. Cl. .................................................. 709/318
(58) Field of Search .................. 395/616, 604, 395/346, 677, 200.04, 615, 680; 345/335; 709/245

(56) References Cited

U.S. PATENT DOCUMENTS

| | | | |
|---|---|---|---|
| 5,421,012 | * 5/1995 | Khoyi et al. | 395/677 |
| 5,497,484 | * 3/1996 | Potter et al. | 395/616 |
| 5,524,238 | * 6/1996 | Miller et al. | 395/604 |
| 5,537,548 | * 7/1996 | Fin et al. | 395/200.04 |
| 5,606,674 | * 2/1997 | Root | 395/346 |
| 5,734,901 | * 3/1998 | Sidhu et al. | 395/680 |
| 5,737,495 | * 4/1998 | Adams et al. | 395/615 |
| 5,818,447 | * 10/1998 | Wolf et al. | 345/335 |
| 5,867,660 | * 2/1999 | Schmidt et al. | 395/200.57 |
| 5,928,333 | * 7/1999 | Landfield et al. | 709/245 |

OTHER PUBLICATIONS

Allen, Daniel, *On Macintoch Programming: Advanced Techniques*, Chaps 2,4,6, 1990.*
Allen, Daniel, *On Macintosh Programming: Advanced Techniques*, Chaps 2,4,6, 1990.*
Apple Computer, Inside MacIntosh: Interapplication Communication; Chaps 1, 3,4, 1993.*
Macintosh, *Inside Macintosh: Macintosh Toolbox Essentials*, Chap 7, 1992.*

* cited by examiner

Primary Examiner—Majid Banankhah
Assistant Examiner—Pat Caldwell
(74) Attorney, Agent, or Firm—Blakely, Sokoloff, Taylor & Zafman

(57) ABSTRACT

A method and apparatus for processing with a preferred processing application having a preferred identifier, an event associated with an object created by a dedicated creator application is provided. The method includes the steps of receiving the event, intercepting the event with a relay application program, and forwarding, with the relay application program, the intercepted event to the preferred processing application program.

9 Claims, 11 Drawing Sheets

METHOD AND APPARATUS FOR RELAYING EVENTS INTENDED FOR A FIRST APPLICATION PROGRAM TO A SECOND APPLICATION PROGRAM

BACKGROUND OF THE INVENTION (1) Field of the Invention

The present invention relates to the field of computer systems. More particularly, the present invention pertains to a computer system provided with a system for reading files containing data, such as an electronic mail system.

(2) Description of the Related Art

As it is well known, most modern computer systems are provided with the capability of electronically communicating with other computer systems for allowing users to share information. Electronic mail, for example, offers such capability of communicating by providing the means for transmitting, receiving, and processing user-generated messages between computer systems. Electronic mail, or e-mail, functions similarly to a post office mail system, by receiving letters from a sender and further transmitting these letters to an addressee. Electronic mail systems also provide features allowing other information to be transmitted from one computer system to another, such as files or other data typically referred to as enclosures. While typical prior art electronic mail systems have surpassed the capabilities offered by conventional post office mail systems, by providing capabilities for forwarding mail messages, responding to mail messages, opening messages, printing messages, removing enclosures (files) included with the messages, etc., such electronic mail systems suffer from several disadvantages.

One disadvantage of prior art electronic mail systems is that they typically require the use of a dedicated electronic mail application program for reading and otherwise processing messages. For example, in some circumstances the recipient of a message must read electronic mail documents with the same type of application that the sender used to create the document. Users of computer systems such as, for instance, Apple® Computer, Inc., located in Cupertino, Calif., may prefer to read AppleMail™ documents, which are documents created by an AppleMail application program (dedicated creator application), with an application program other than AppleMail. Such a preferred application program may be simply a text editor or a more sophisticated program, capable of translating AppleMail documents, such as ClarisWorks or BBedit. Similarly, users may desire to open or print a document created by a first application program (e.g., Microsoft Word) by using a second application program (e.g., WordPerfect).

Conventional computer systems such as Apple systems provide an application program such as MacLink® Plus/PC for translating files having a first format to files having a second format. For example, files having formats compatible to DOS operating systems can be translated into files compatible with the MacIntosh or Apple operating system. For more information related to the MacLink® translator please see MacLink® Plus PC user manual. Similarly, Apple Systems provide an application program called MacIntosh Easy Open to simplify opening documents created with programs that are not currently installed in the system's hard disk. The Easy Open application program recognizes different file types and uses built-in translators to help convert files and open them in an appropriate application that is present in the system. For more information related to the MacIntosh Easy Open, please see chapter 5 of the publication MACWORLD SYSTEM 7.5 BIBLE, 3rd Edition, published by IDG Books Worldwide, Inc. Present electronic mail systems, however, do not support the selection of a preferred mail reader application different than a dedicated reader application such as AppleMail reader in Apple systems and redirect an event to such preferred mail reader application. In electronic mail, and other application programs which transmit data, the sender does not necessarily know the capabilities of the recipient. In the traditional post office, all that is required is that the sender knows that the recipient is able to read. Similarly, electronic mail users should be able to use any type of electronic mail program, word processing or text editor that they choose, irrespective of that used by the sender of the data. This allows users to read and/or process any type of mail documents with a preferred application with which they feel more comfortable or which they find more appropriate for their particular goals.

FIG. 1 shows a block diagram of a prior art system with a second application program 6 processing an object 2 created by a first application program 1 (e.g. reading an electronic mail document). The object document 2 can be created by creator application program 1 in a remote computer system or the local computer system. The object document 2 has a creator type 3 'aaaa' which corresponds to the creator type 'aaaa' of the creator application program 1. Computer systems such as the Macintosh® of Apple Computer® can identify an application program through the "signature" of the application. The signature is a unique four-character sequence such as 'aaaa.'

Whenever an application program 1 creates a document, the application program 1 assigns the document a creator type and a file type. Typically, an application program sets its signature as the document's creator type 3. When a user double-clicks a document or selects it and chooses "Open" or "Print" from the Finder's file menu, a Finder 5 reads the creator field 9 of that file to find the document's creator type 3. Finder 5 is an application that works with the operating system software 4 to keep track of files and to manage the user's desktop display. After determining the creator type 3, Finder 5 searches for an application program with a signature corresponding to the same creator type as the one found in the creator field 9 of the object selected or clicked. When Finder 5 finds the application program 6, Finder 5 may launch this application program 6 or call the Process Manager to activate the application program. The Process Manager creates a partition of memory for the respective application program, loads the code into this partition, and performs some operations in preparation for launching. The Process Manager then returns control to Finder 5. For more information regarding Apple systems and identification of applications by signatures see the publication INSIDE MACINTOSH, MACINTOSH TOOL BOX ESSENTIALS (1992) available from Addison-Wesley Publishing Company. Similarly, conventional mail systems have associated mail information with an application program that created them by assigning to each mail document a signature or creator type corresponding with the signature of the creator application program which created that particular mail document.

The creator type of the creator application 1 and of the object 2 is used by the Finder 5 to determine what application, in a local system, can process an event associated with the received object 2. An event is defined as the means by which an Event Manager communicates information about user actions, changes in the processing status of the application, and other occurrences that require a response from an application. The Event Manager represents the collection of routines that an application can use to receive information about actions performed by the user, to receive notice of changes in the processing status of the application, and to communicate with other applications.

Typically, upon the generation of an event associated with object 2, such as double-clicking on a file in the Finder 5, the Finder 5 sends a request to the Operating System 4 which, in turn, references a table containing a creator. The table is stored in a non-volatile storage media or system memory storing all the 4-byte creator types or signatures of the applications that are present in the system. For each creator type in the table, a dedicated processing application program 6 is referenced. For example, when a request or event is sent to open a document that has the creator type 'aaaa,' the Finder will determine whether the 'aaaa' creator type is present in that table. Assuming that the creator type is present in the table, the Finder then references and alerts the dedicated processing application 6 that a request to open a document is pending. For example, assuming that the creator application 1 is an AppleMail application having the signature 'aaaa,' the source object 2 will have the creator type 'aaaa.' Upon receipt of an event associated with object 2, such as open document or print document, the Operating System 4 will forward the respective event to the dedicated processing application 6 which can be an AppleMail application or any application of the same type as the dedicated creator application program 1. The dedicated processing application 6 will then process the requested event allowing a user, for example, to read the object 2, in the case where the event associated with the object 2 is an open document event.

However, according to the system illustrated in FIG. 1, the user is typically not able to use a preferred local processing application such as e-mail reader or word processor, other than the dedicated processing application because the Finder 5 typically forwards the event associated with object 2 to the dedicated processing application 6 or a copy thereof. As such, it is desirable to provide a method and apparatus having the capability to forward events associated with an object created by a dedicated creator application to a preferred processing application, such that desired events associated to that object can be processed by the preferred processing application program.

BRIEF SUMMARY OF THE INVENTION

The present invention provides for a computer-related method for processing, with a preferred processing application program having a preferred identifier, an event associated with an object generated by a dedicated creator application program having a dedicated identifier. The method includes the following steps: a) receiving the event; b) a relay application program intercepting the event; and c) the relay application program forwarding the intercepted event to the preferred processing application program.

The present invention also provides for a computer system for processing, with a preferred processing module having a preferred identifier, events associated with an object generated by a dedicated creator module having a dedicated identifier. The events directed to the dedicated processing module have a dedicated identifier. The computer system includes a processor, a memory coupled to the processor, an interactive input-output system coupled to the processor, and a display coupled to the processor. The computer system further includes: a module for relaying the event, associated with an object generated by the dedicated processing application, to the preferred processing module, the module for relaying the event being coupled to the processor; a module for selecting the preferred processing module, the module for selecting being coupled at an input thereof to the preferred processing module, and that an output thereof to the module for relaying; a module for installing the module for relaying and the module for selecting, the module for installing being coupled, at an output thereof, to the module for relaying and to the module for selecting; and a module for decoupling the module for relaying and the module for selecting. The module for relaying is adapted to intercept an event associated with an object generated by the dedicated creator module. The module for relaying is also adapted to forward the event intercepted to the preferred processing module.

The present invention further includes a computer system for processing, with a preferred processing application program having a preferred identifier, events associated with objects generated by a dedicated creator application program. The events are directed to a dedicated processing application destination with a dedicated identifier. A dedicated creator application program has a dedicated identifier. The computer system includes a processor, a computer-readable storage medium coupled to the processor, an interactive input/output system coupled to the processor, and a display coupled to the processor. The computer-readable storage medium includes: a first region storing a relay application program for relaying an event, associated with an object generated by the dedicated creator application program, to the preferred processing application program; a second region storing a selection application program for selecting the preferred processing application program; a third region storing an installation program for installing the relay application program and the selection application program; and a fourth region storing a removing application program for de-installing the relay and the selection application programs. The relay application program has a first program portion directed to intercept the event associated with an object generated by the dedicated creator application program. The relay application program further has a second program portion directed to forward the intercepted event to the preferred processing application program.

BRIEF DESCRIPTION OF THE DRAWINGS

The features, aspects, and advantages of the present invention will become more fully apparent from the following Detailed Description, appended claims, and accompanying drawings in which:

DETAILED DESCRIPTION OF THE INVENTION

In the following description, specific steps, procedures, command options, command items, and other specifics are set forth in order to provide a thorough understanding of the present invention. However, it will be apparent to one skilled in the art that the present invention may be practiced without these specific details. In other instances, well-known systems and methods are shown in diagrammatic block or flow diagram form in order not to unnecessarily obscure the present invention.

Figure 1:
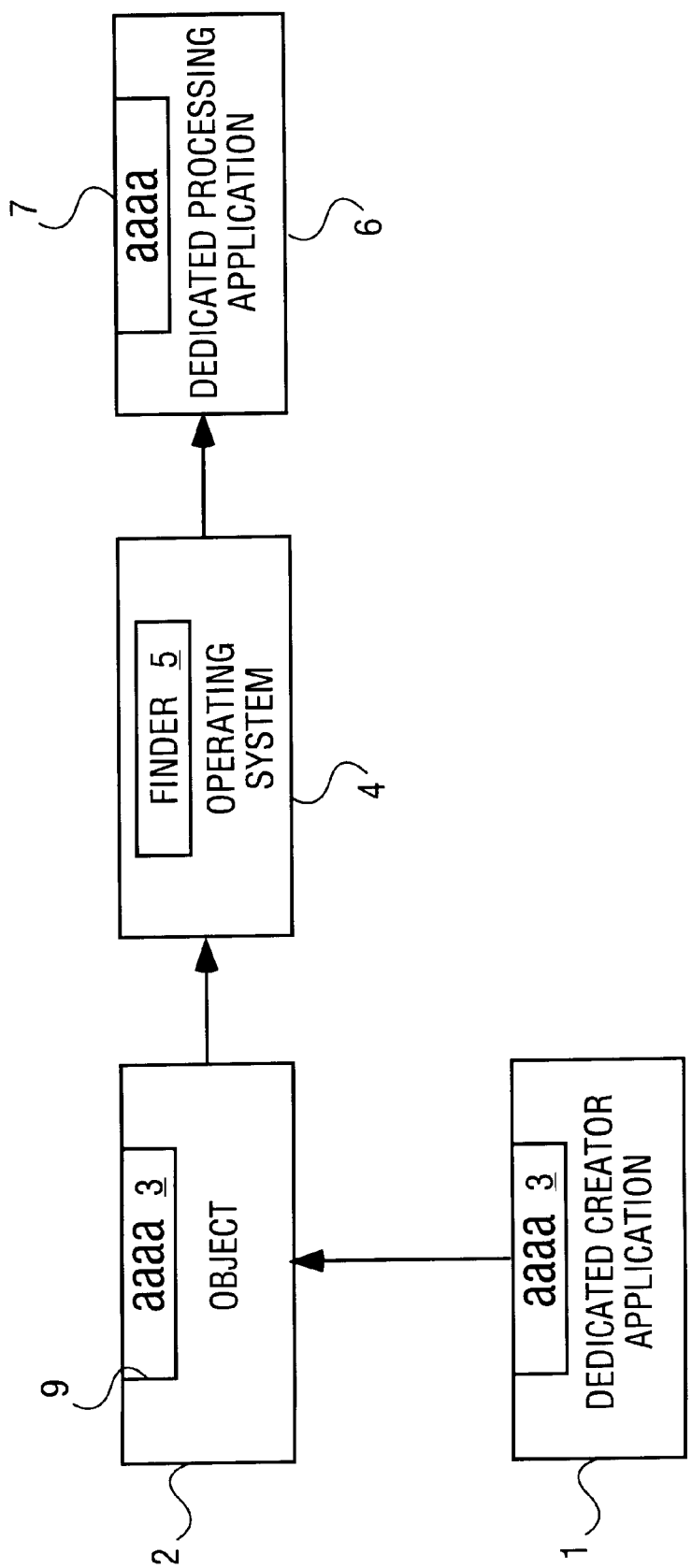
FIG. 1 shows a block diagram of a prior art computer system for processing objects with a first creator identifier by an application program having the same creator identifier, e.g. reading electronic mail documents.
Figure 2:
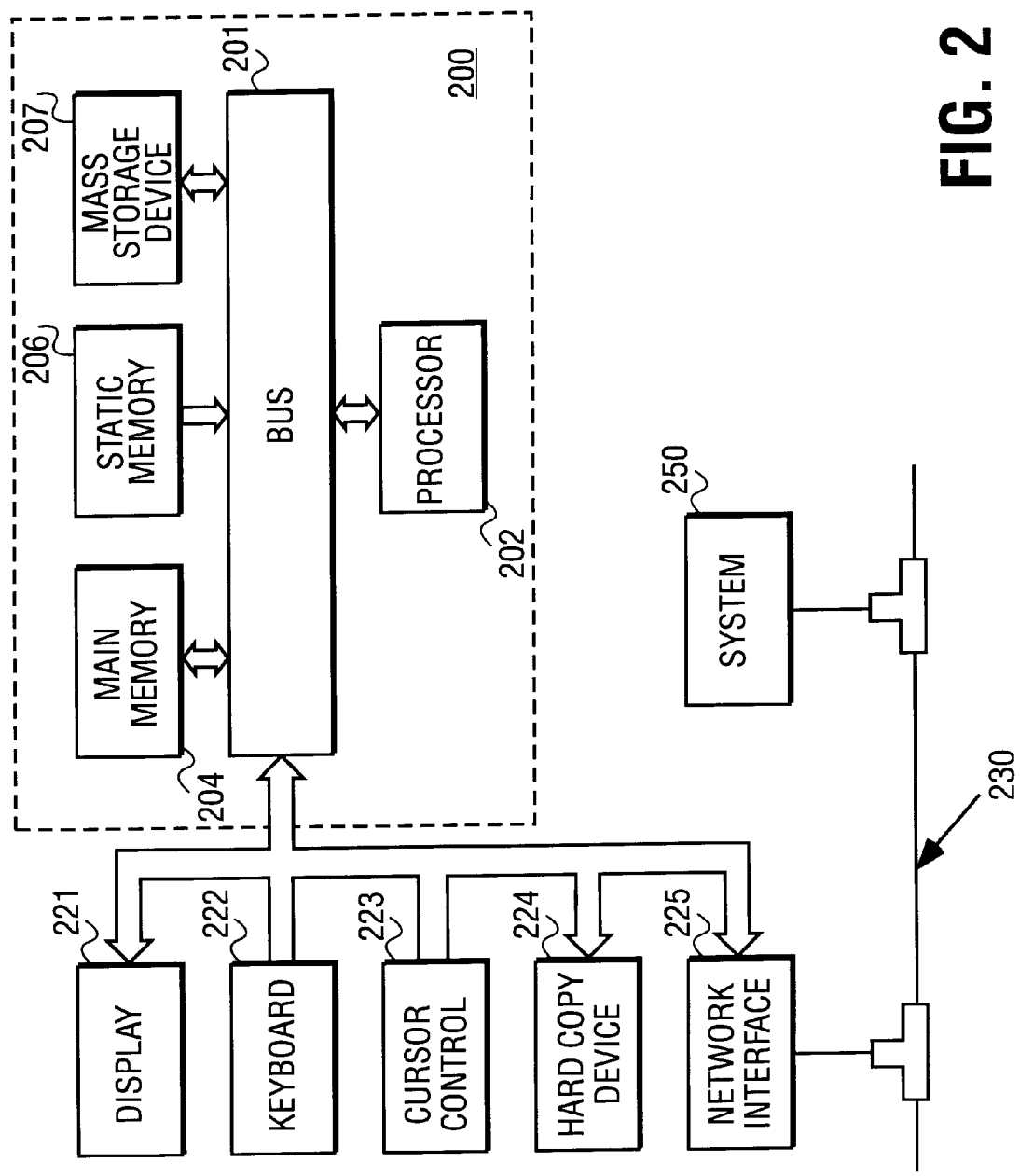
FIG. 2 shows a block diagram of a computer system on which an embodiment of the present invention may be implemented.

Referring to FIG. 2, a computer system 200, in which an event relaying scheme such as the application program of the present invention is incorporated. The computer system 200 comprises a bus 201 for communicating information and a processor 202, coupled to bus 201, for processing information. System 200 further comprises a random access memory (RAM) or other dynamic storage device 204 (referred to as main memory), coupled to bus 201, for storing information and instructions to be executed by processor 202. Main memory 204 may also be used for storing temporary variables or other intermediate information during execution of instructions by processor 202. Computer system 200 also comprises a read only memory (ROM) and/or other static storage device 206 coupled to bus 201 for storing information and instructions for processor 202, and a mass storage device 207 such as a magnetic disk or optical disk and its corresponding disk drive. Mass storage device 207 is coupled to bus 201 for storing information and instructions. Computer system 200 may further be coupled to a display device 221, such as a cathode ray tube (CRT) or liquid crystal display (LCD) via bus 201, for displaying information to a computer user. Computer system 200 is also coupled to an alphanumeric input device 222, including a keyboard, for communicating information and command selections to processor 202. Direction information and command selections to processor 202 can be input via a cursor control device 223, such as a mouse, a trackball, stylus, or cursor direction keys, coupled to bus 201. Another device which may be coupled to bus 201 is hard copy device 224 which may be used for printing instructions, data, or other information on a medium such as paper, film, or similar types of media. While any or all of the components of system 200 and associated hardware may be used in a preferred embodiment, it can be appreciated by one skilled in the art that any other type of configuration of the system may be used for various purposes.

System 200 may further be coupled to a network interface 225 which provides an interface with a network backbone such as 230. This network 230 may be one of numerous networking systems commercially available, such as the AppleTalk® brand network available from Apple® Computer, Inc. of Cupertino, Calif., Ethernet, or Token Ring networks as are generally commercially available. Such a network provides an interface among many systems and, therefore, system 200 may communicate with a second system such as 250, shown in FIG. 2, using well-known electronic mail techniques for the transmission and reception of electronic messages between systems.

In the preferred embodiment, computer system 200 is one of the Macintosh® family of personal computers such as the Macintosh® Quadra™, Macintosh® Performa™, or PowerMac® brand personal computers manufactured by Apple® Computer, Inc. of Cupertino, Calif. (Apple, Macintosh, Quadra, Performa, and PowerMac are trademarks of Apple Computer, Inc.). Processor 202 can be one of the 68000 family of microprocessors, such as the 68030 or 68040 or PowerPC such as the 601 or 604 manufactured by Motorola, Inc. of Schaumburg, Ill.

Note that the following discussion of the user interface display methods and apparatus of the preferred embodiment discussed herein will refer specifically to a series of routines which are compiled, linked, converted to object code in computer system 200, and loaded into main memory 204 for execution during system run-time. It can be appreciated by one skilled in the art, however, that the method and computer systems according to the present invention may be implemented in special purpose hardware devices, such as discrete logic devices, large scale integrated circuits (LSI's), application-specific integrated circuits (ASIC's), or other specialized hardware. It can thus be appreciated by one skilled in the art that the description herein has equal application to other computer systems having similar functions.

Figure 3:
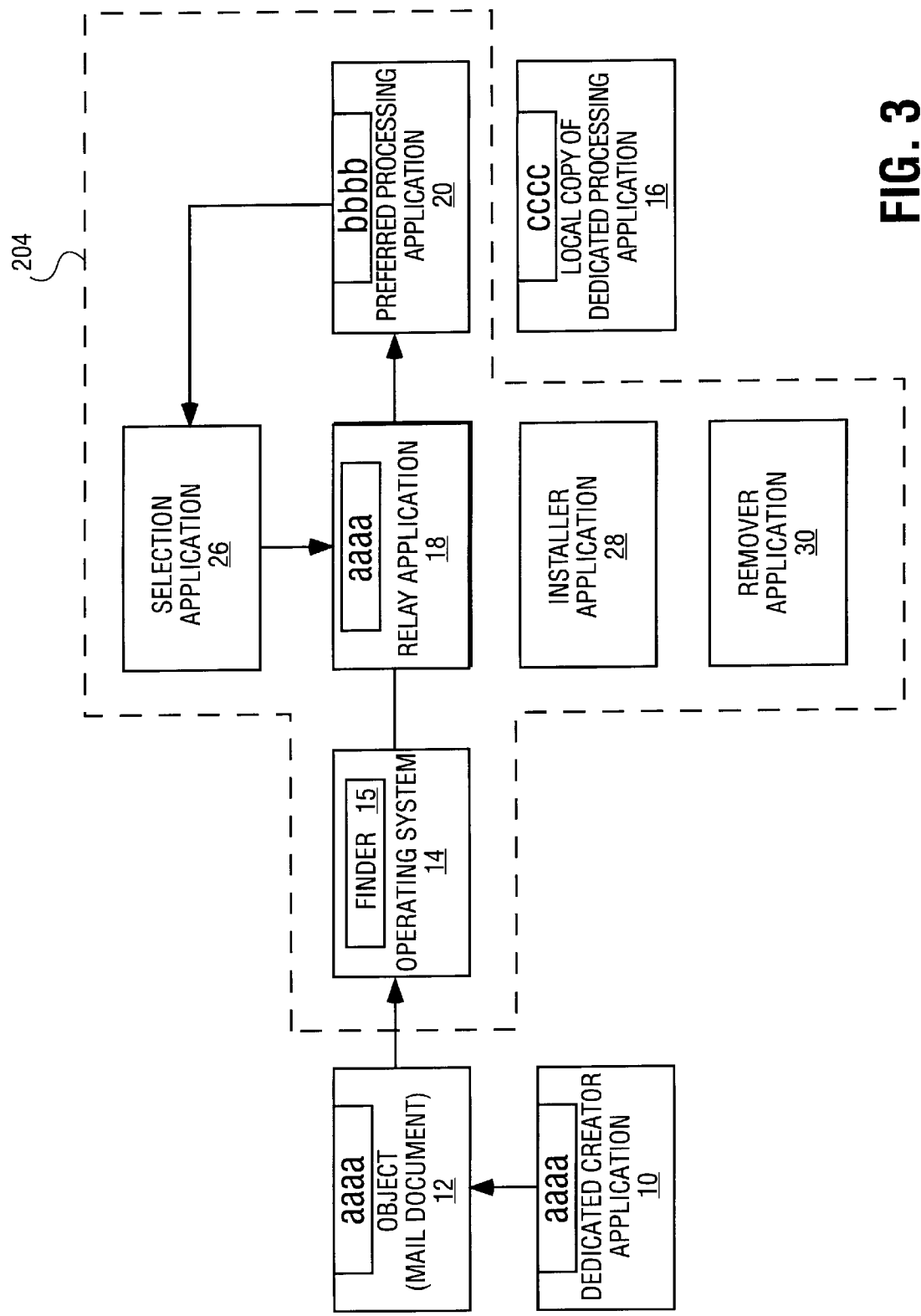
FIG. 3 is a block diagram representing the operation of a computer system with an electronic mail system in one implementation of the present invention.

FIG. 3 shows a block diagram representing a computer system having an electronic mail system according to the present invention and implementing the process according to the present invention. The computer system according to the present invention includes an installer application program 28, a relay application program 18, a select application program 26, and a remover application program 30. Any and/or all of these functional blocks or data may be stored in main memory 204 (shown in dotted lines) at any given time according to the need to have the particular block reside in the main memory operated upon (e.g. read or executed). The installer application program 28 can change the creator type of all local copies of the dedicated mail processing application (e.g. block 16) in the local system from its original creator type 'aaaa' to another creator type 'cccc.' A dedicated processing application 16 or a local copy thereof is an application which can process an object generated by the dedicated creator application program 10. That is, the dedicated creator application 16 or the local copy thereof has the same creator type as dedicated creator application program 10. Relay application 18, which assumes the creator type 'aaaa' of the dedicated processing application 10, launches the preferred mail processing application 20 when a certain type or types of event/events is/are received. Relay application 18 then forwards the event to the preferred processing application 20. Selection application 26 allows the user to select the preferred processing application 20 via a graphic user interface (GUI) (not shown). While the selection of the preferred processing application 20, in a preferred implementation, is done with a GUI, text interfaces can be used as well. The remover application 30 allows the user to delete the relay application 18 and the selection application 26 from the system. This application restores back to 'aaaa' the creator type of all local copies of the dedicated processing application 16, which have been assigned the alternate creator type 'cccc' during installation.

As one can see from FIG. 3, in operation, an object 12 having a first creator type 'aaaa' is processed by the operating system 14. This object may include a mail document transmitted by a first system 250 to the local system 200, or any other object created by another dedicated creator application 10. If a user selects the object 12 by means of the selection GUI, an event associated with the object 12, such as a print document or open document, is generated. As the creator type of the relay application 20 has been modified to 'aaaa', which is the creator type of the dedicated mail processing application 16, finder 15 causes this event to be received by the relay application 18. The relay application 18 then forwards the event associated with object 12 to a preferred destination application 20, instead of forwarding the event associated with the object to the dedicated mail processing application 16.

Figure 4:
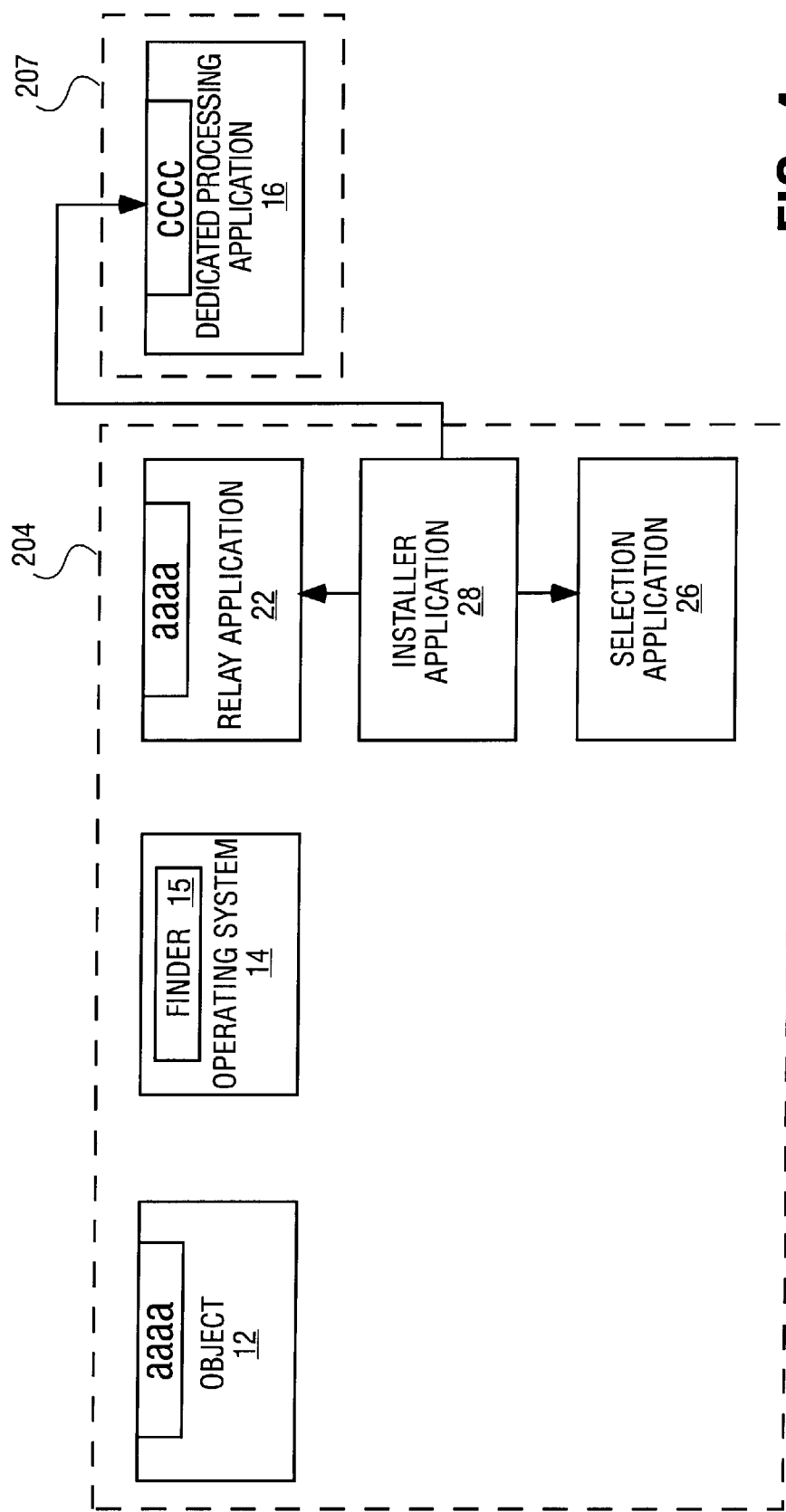
FIG. 4 is a block diagram illustrating the installation operation of the relay and selection application programs of the computer system in an implementation of the present invention.

FIG. 4 is a block diagram illustrating installation of the relay application 22 and of the selection application 26 in an embodiment of the present invention. Installer application 28 is an application program designed to prepare the user's system 200 for installation and to copy the files required to run the relay application 22 and the selection application 26. The preparation of the user system 202 includes searching all non-volatile storage devices (e.g. 207) for all copies (e.g. 16) of the dedicated mail processing application and changing the creator type in the file systems. The files installed by this processor include the relay application 22 and the selection application 26. As explained above, installer 28 changes the creator type of all local copies of the dedicated mail processing application 16 from 'aaaa' to 'cccc.' In so doing, the computer system and the process of the present invention ensure that during system operation, the relay application program 22 will forward an event associated with object 12 to the preferred destination application 20 when configured by the user. As one can see, the relay application 22 assumes the creator type 'aaaa' of the dedicated processing application 16 in order to intercept events directed to the dedicated processing application program 16.

Figure 5:
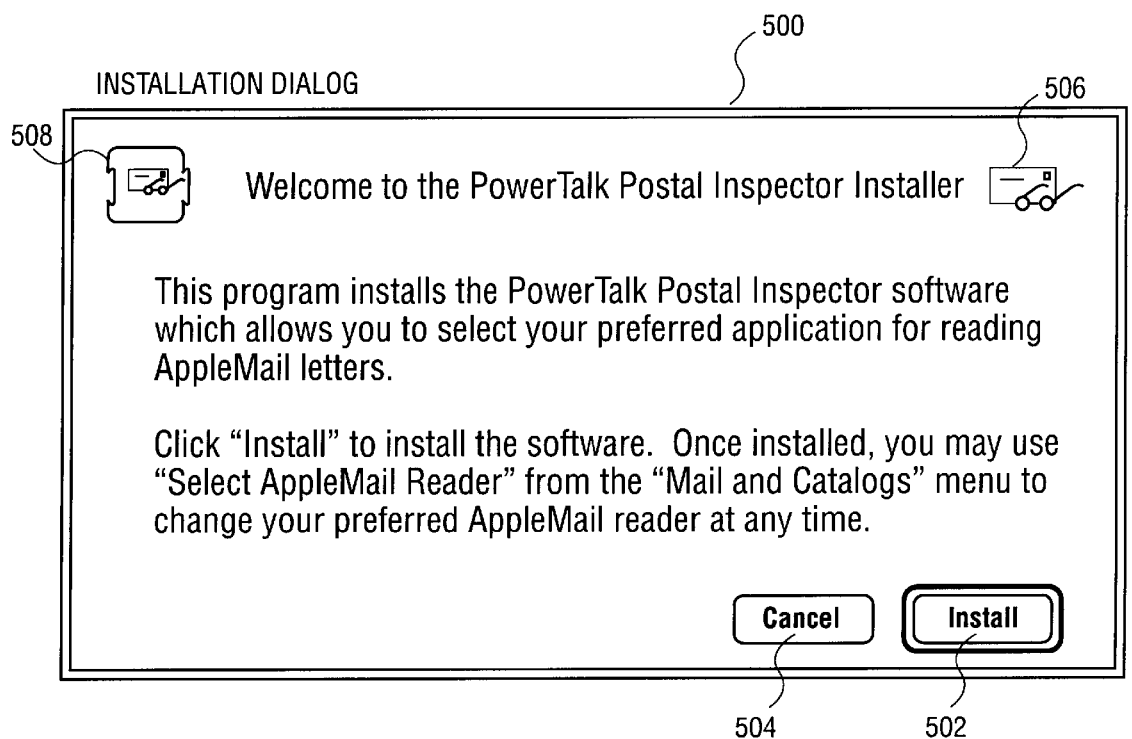
FIG. 5 illustrates an installation dialog box for the installation of the relay application of the computer system in an implementation of the present invention.

The installation of the relay application is performed by an installer application 28 at the request of a user. A user can initiate the installation of the relay application by means of an installation dialog box 500 illustrated in FIG. 5. The explanatory dialog illustrated in FIG. 5 is a preferred non-limiting implementation for installing the relay application. A text implementation can be used as well. The dialog box 500 includes an "Install" button 502, a "Cancel" button 504, the icon 506 representing a selected or de-selected preferred processing application and icon 508 representing a selected or de-selected relay application. If the user selects the "Install" button 502, the installer application will be activated according to the process illustrated in conjunction with the flowchart diagram of FIG. 6.

Figure 6:
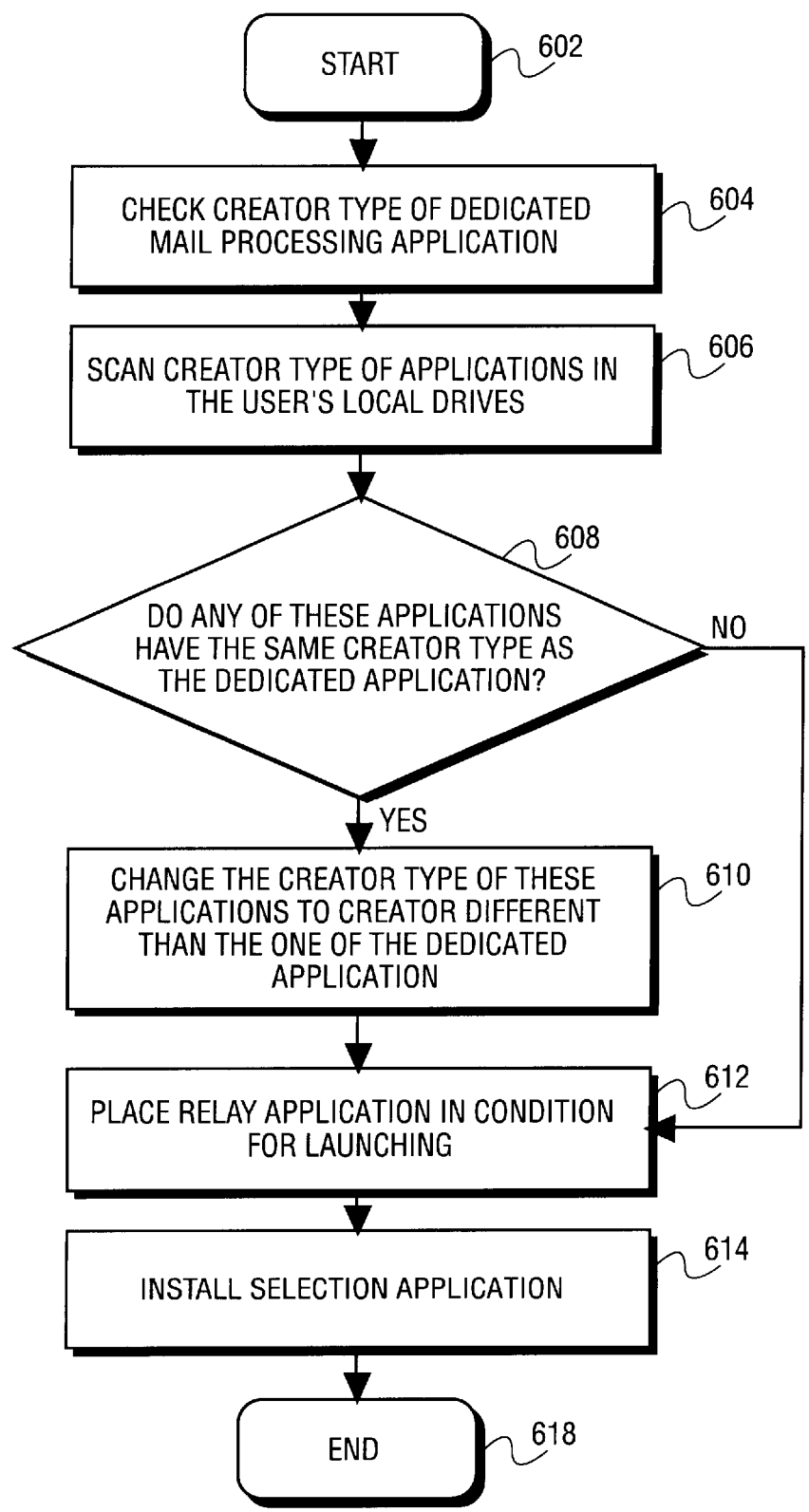
FIG. 6 illustrates a process flow diagram of the installation process performed by the installer application in the computer system in an implementation of the present invention.

The installation process 600 illustrated in FIG. 6 starts at block 602 upon a user's activation of the "Install" button of the dialog box 500. At block 604, the installer will check the creator type of the dedicated mail processing application 16. This step is performed, assuming that the computer system according to the present invention can have more than one mail processing application and only one such application, at one time, is assigned as the dedicated mail processing application 16. In case that the computer system has only one dedicated mail processing application 16, the step of checking the creator type of the dedicated mail processing application, performed at block 604, can be skipped and the installer can go to step 606. At block 606, the installer scans the user's local drives (e.g. 207) for all copies of the dedicated mail processing application 16. In this particular example, installer 28 scans the local drives for all instances of applications having the creator type 'aaaa.' Installer 28 then determines, at decision block 608, if any of the applications in the user's local drives have the same creator type as the dedicated mail processing application 16. If the local drives coupled to the user's system 200 contain applications that have the same creator type as the dedicated mail processing application, then the installer changes the creator type of these applications to a second creator type 'cccc,' different from creator type 'aaaa,' at block 610. In an Apple® system, the installer also fixes the bundle resource for the dedicated mail processing application 16 so that its icon matches its new creator type 'cccc.' A resource is defined as any data stored according to a defined structure in a resource fork of a file. A bundle resource associates all of the resources used by the Finder to an application. In particular, a bundle resource associates an application and its documents with their corresponding icons.

The installer then places the relay application in condition for launching by placing the relay application in the Extension's Folder of the startup disk at block 612. The Extensions Folder, located in the System Folder, holds code that is not part of the basic system software, but that provides system-level services, such as printer drivers and system extensions among other things. The items found in the Extensions Folder, including the relay application 18, are started up every time the Finder 15 starts up the system.

Accordingly, in one embodiment of the present invention, relay application 18 will be launched by the Finder 15 at system startup time. However, it is conceivable that users can set up their system such that the relay application 18 may be placed at another location where this application program can be launched conveniently at some predetermined time or when required. At block 614, installer 28 installs selection application program 26 by placing selection application program 26 in the Mail and Catalogs folder of the Apple Menu Items folder of the startup disk. The Mail and Catalogs folder, just like the Extensions folder, is a predetermining place in the system. Then, the explanatory dialog 500 illustrated in FIG. 5 is dismissed and the user receives a message noting whether or not the installation was successful.

Once relay application 18 and selection application 26 are installed, selection application 26 can be invoked at any time from the Mail and Catalogs folder, in case a user wishes to change preferred processing application 20. Selection application program 26 can present a movable modeless dialog box which provides for changing a current processing application to a preferred processing application.

Figure 7:
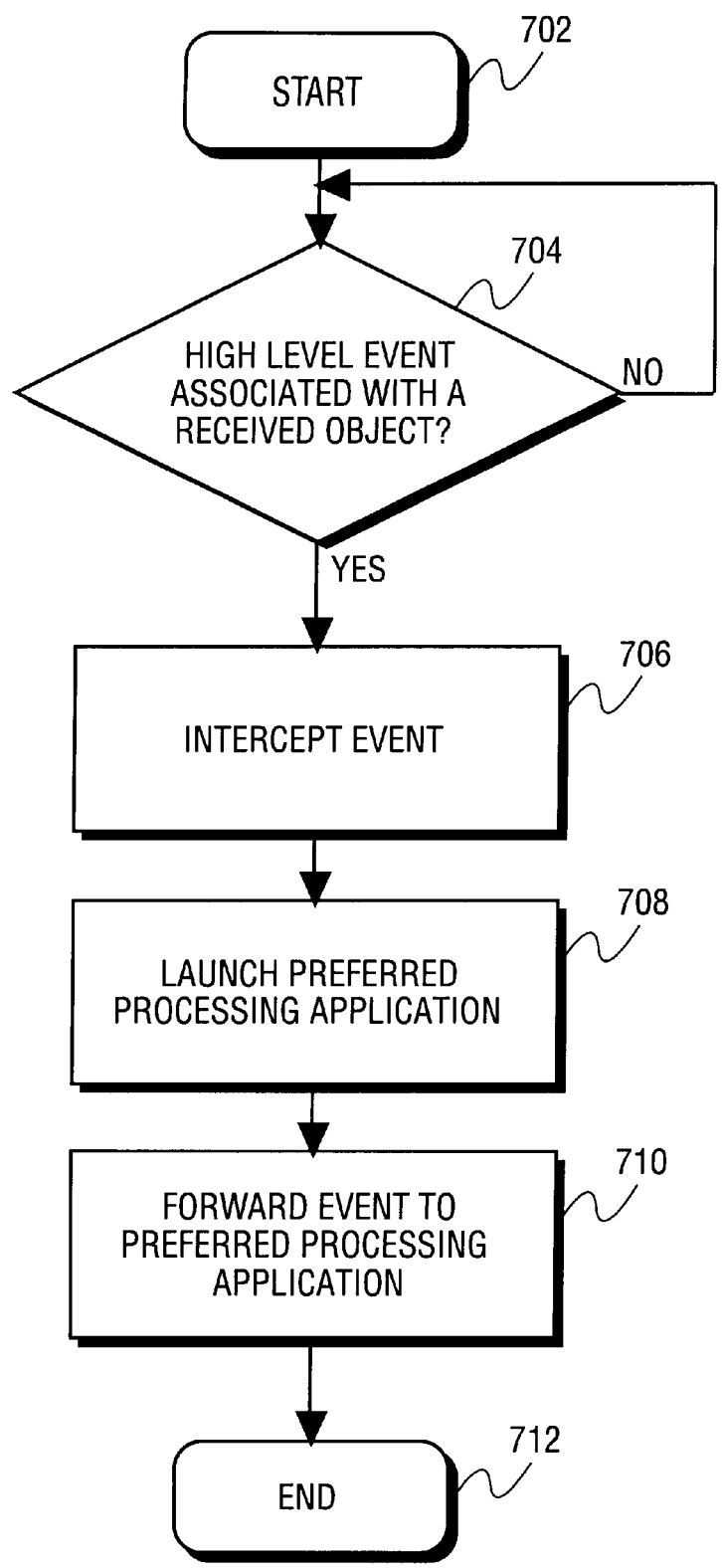
FIG. 7 shows a high-level flowchart diagram illustrating a process of the relay application in an implementation of the present invention.

FIG. 7 shows a flowchart diagram illustrating the operation of relay application 18. Relay application 18 is launched at startup initialization, at block 702 in FIG. 7. While this application is launched at startup, it can be subsequently quit and relaunched. At decision block 704, the relay application checks whether there are any high level events (e.g. "open document" or "print document"), associated with the received object, sent to relay application 18 by the Finder 15. If an event is received, then relay application 18 intercepts the event at block 706. The respective event is intercepted by relay application 18, because the relay application has the same creator type (e.g. 'aaaa') as the creator type of the dedicated mail processing application 16. As previously discussed, events associated with an object created by a creator processing application 10 are not intercepted by local copies of the dedicated mail processing application 16, because the installer has previously changed the creator type of all copies of the dedicated application to a second creator type, as shown in FIG. 6 at block 610. Process 700 then goes to block 708 where it launches the preferred processing application 20 upon receipt of an open or print document event. Relay application 18 knows what is the selected preferred processing application 20 by referring to a file called "preferences file" where aliases of the preferred processing applications and the signature of these applications are stored. Then, relay application 18 changes the target of the open or print document event to the preferred mail processing application 20. Finally, at block 710, the open document or print document event will be forwarded by relay application 18 to the preferred mail processing application 20.

Figure 8:
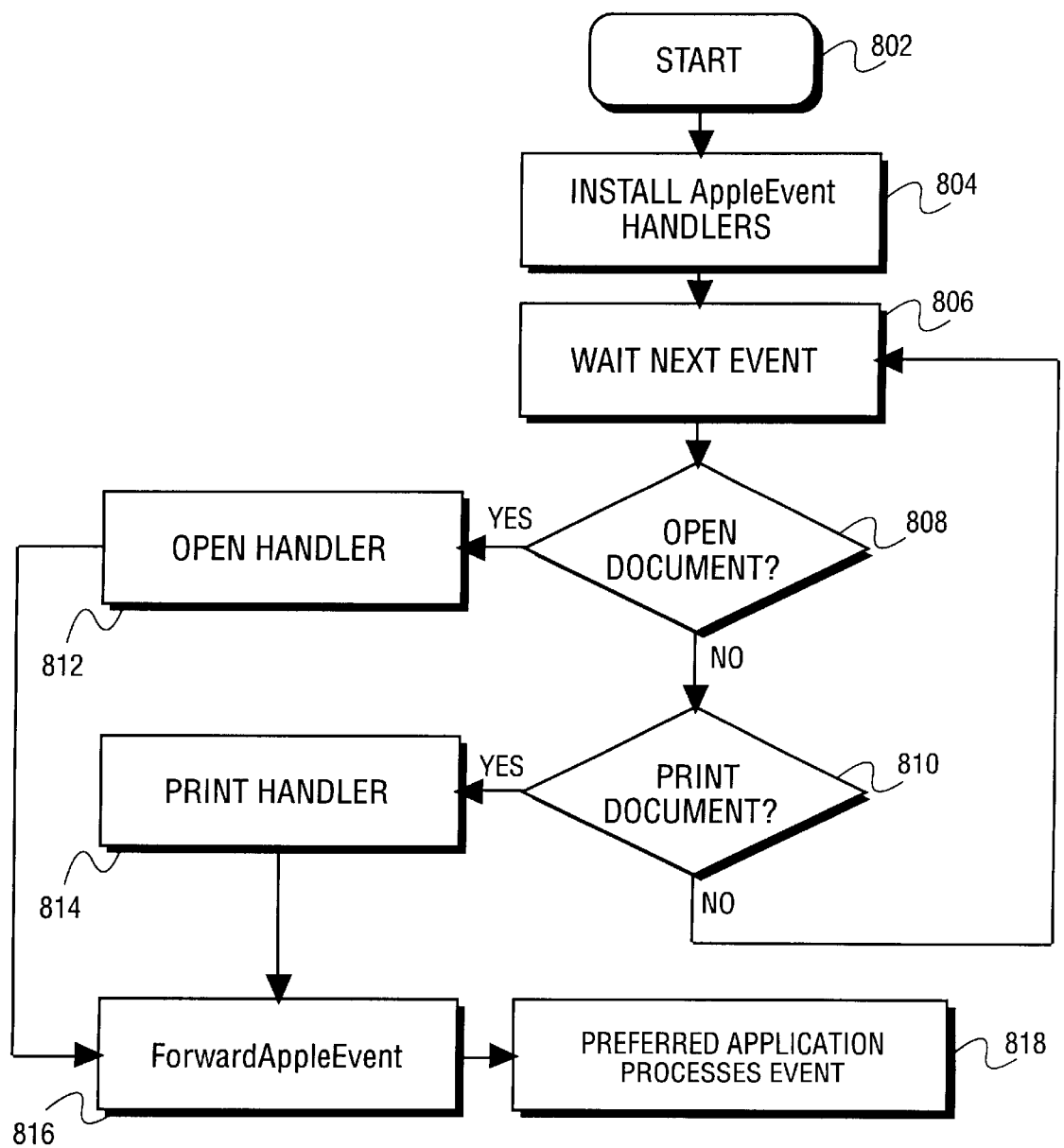
FIG. 8 illustrates a more detailed flowchart diagram of the process of the relay application.

FIG. 8 illustrates graphically a flowchart of the relay application process for Apple® brand Computer Systems. After startup initialization, at block 802, relay application 18 proceeds to install AppleEvent handlers at block 804. Then the relay application enters its event loop at block 806. At this block, as is typical in event handlers, the next event from the event queue is retrieved. The event loop of the relay application filters only on high level events such as "open" document at decision block 808 and "print" document events at decision block 810. If an open document event or print document event has been received, then the open document event handler 812 or the print document event handler 814 passes control to the ForwardAppleEvent function at block 816. The ForwardAppleEvent function resolves the alias or pointer to the preferred mail processing application 20, stored in the "preference file" which contains an alias to the preferred mail processing application 20 and its signature (creator ID). The ForwardAppleEvent function changes the target address of the AppleEvent received to the preferred mail processing application and then resends the event. At block 818, control is transferred to the preferred mail processing application 20 wherein the event forwarded to it will be serviced.

Figure 9:
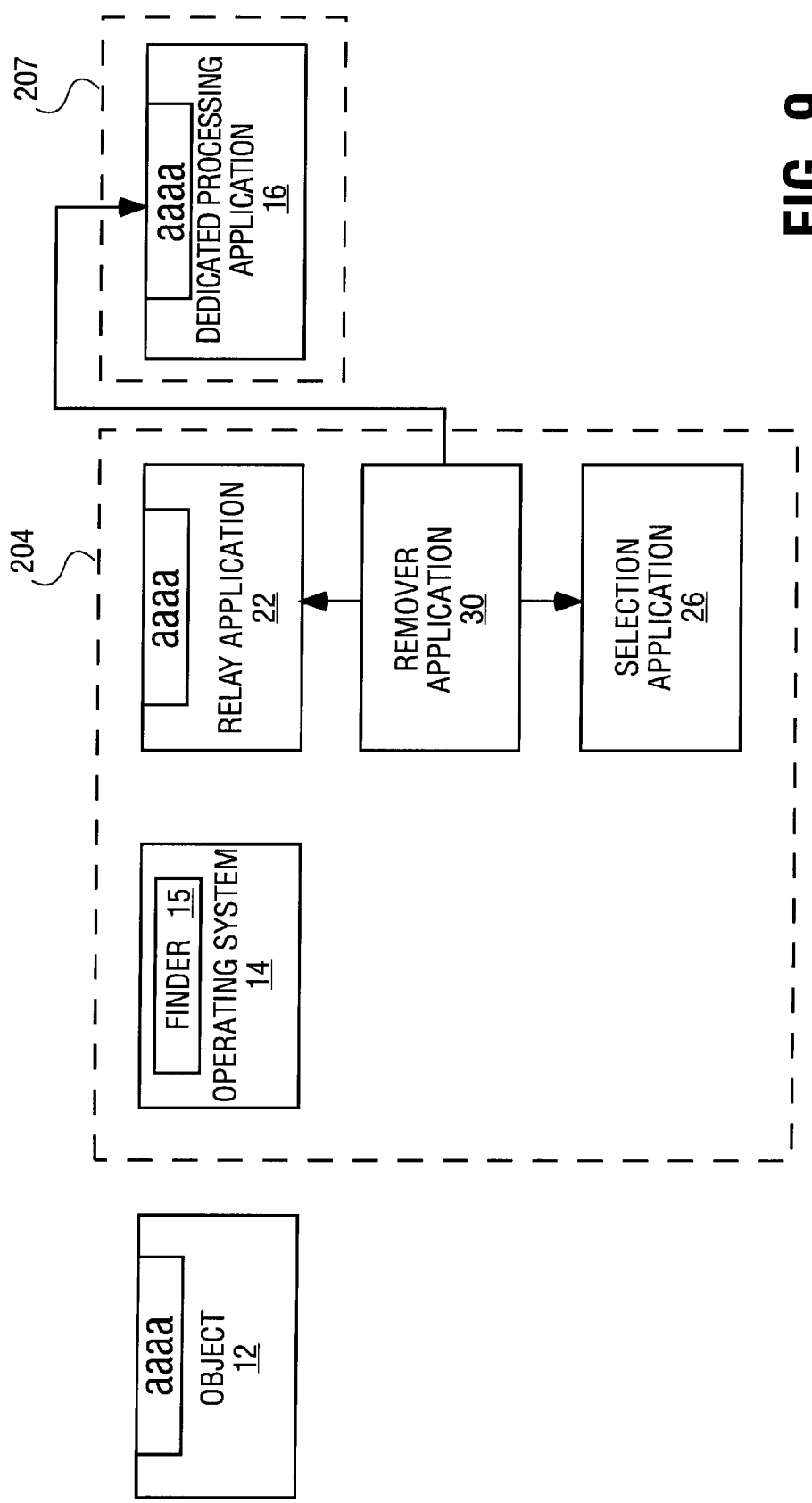
FIG. 9 illustrates a block diagram of the computer system in an implementation of the present invention with the remover application activated.

FIG. 9 illustrates a block diagram of the computer system according to the present invention with Remover application 30 activated. Remover application 30 is a standard application which acts upon the relay application 18 and the selection application 26 and de-installs or deactivates these applications, essentially performing the reverse of the operations performed during installation. Also, Remover application 30 acts upon the copies of the dedicated mail processing application 16, having the creator type 'cccc,' and replaces this creator type with the original creator type 'aaaa.'

Figure 10:
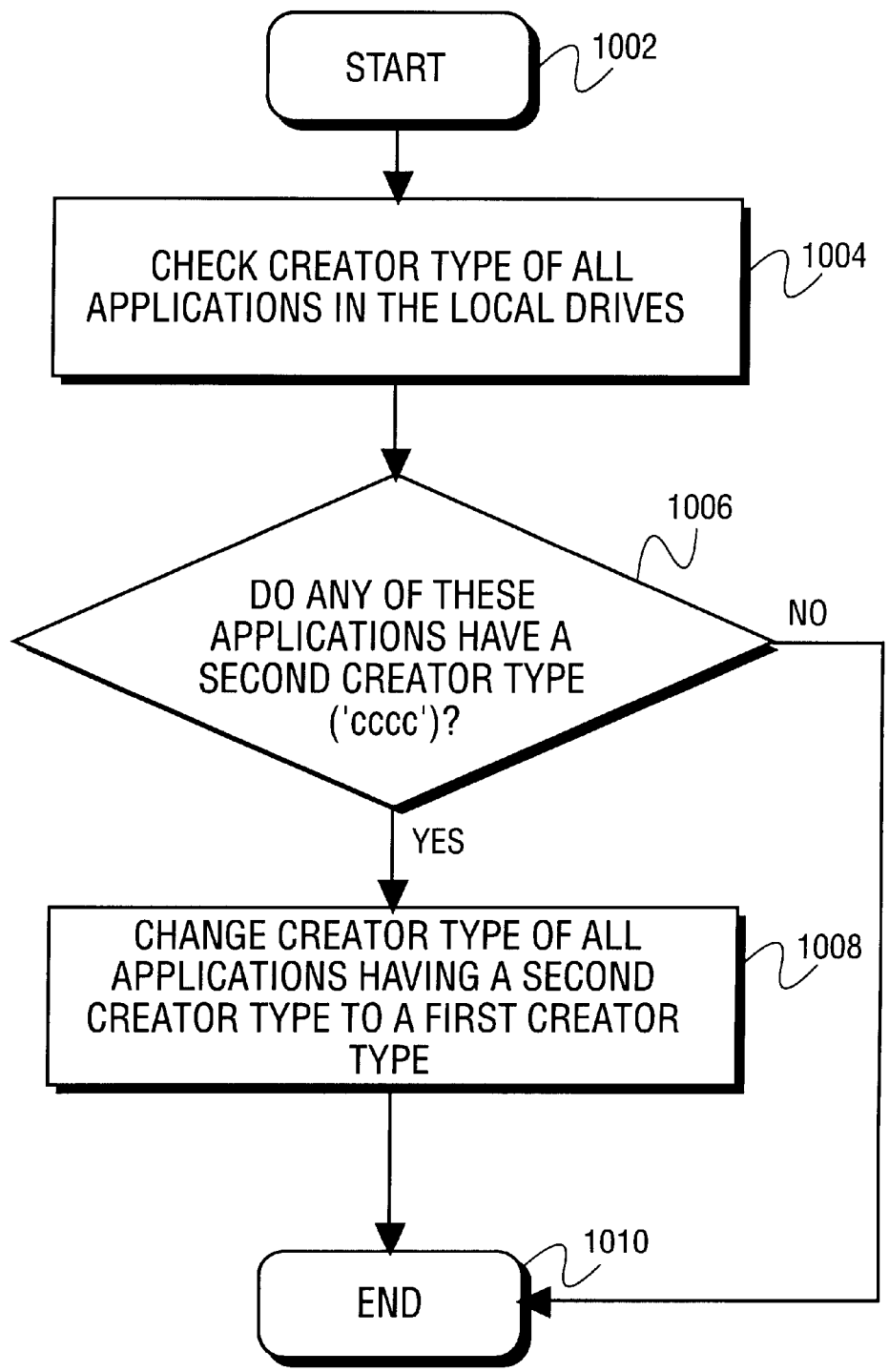
FIG. 10 shows a flowchart diagram illustrating the process of removal in the computer system in an implementation of the present invention.

FIG. 10 shows a flowchart diagram illustrating the process of removing an application according to the present invention. As one can see, part of the removal process includes searching local drives, at block 1004, for copies of dedicated mail processing application 16 having creator type 'cccc.' At block 1006, remover application 30 determines whether any of the applications of the local drives have 'cccc' for creator type, and at block 1008, remover application 30 changes the creator type of all the applications having the second type 'cccc' to the creator type 'aaaa,' which in this case, corresponds to the original creator type of the dedicated mail processing application 16. The remover then fixes the dedicated mail processing application's bundle resource so that its icon matches its new creator type 'aaaa.' The Remover then deletes the relay application and the selection application.

Figure 11:
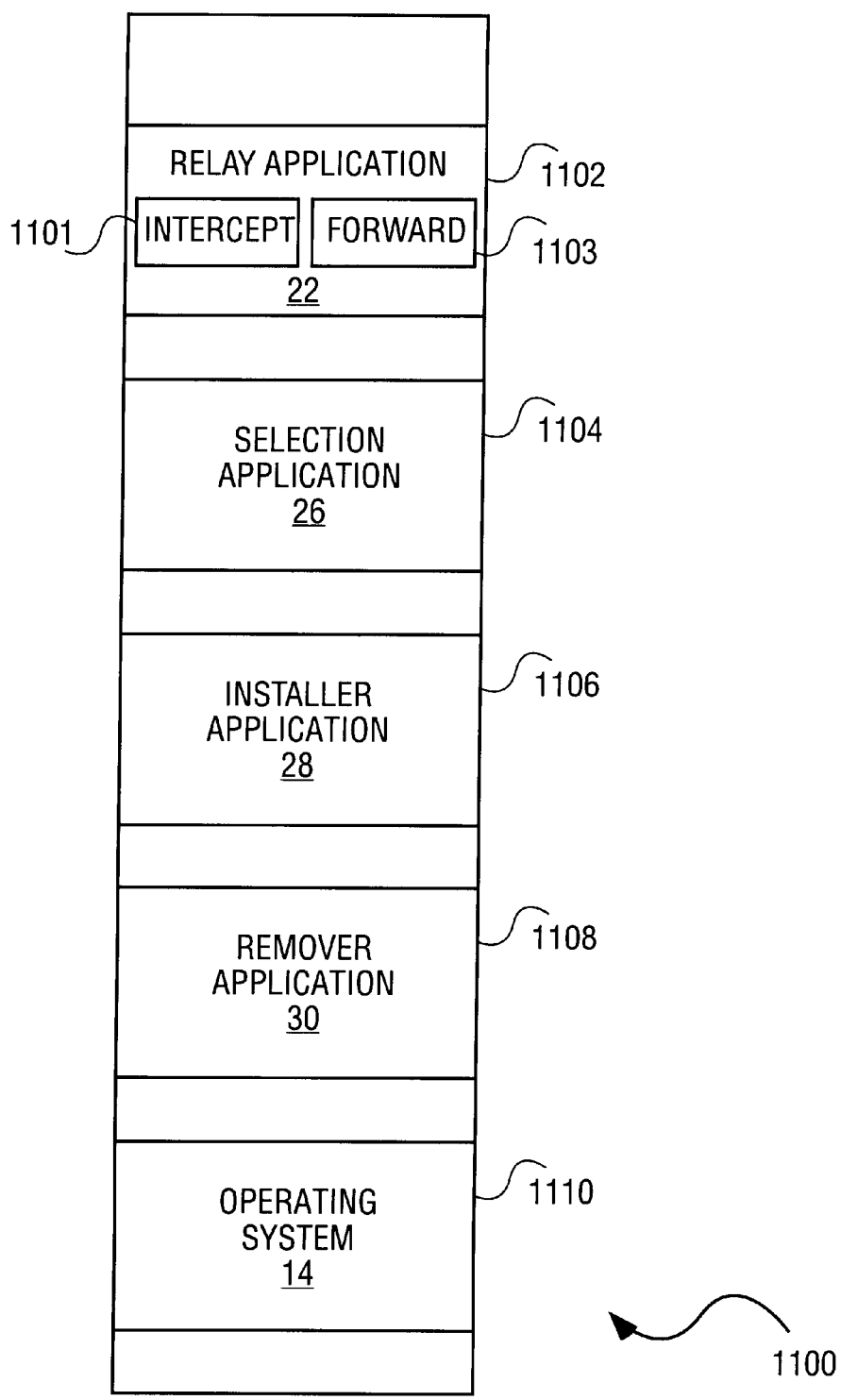
FIG. 11 illustrates a memory storing the application programs in an implementation of the present invention.

FIG. 11 shows a memory device storing the application programs according to the present invention, together with the operating system. As one can see, a memory, 1100 stores in a first region 1102 a relay application 22. The relay application program has a first program portion 1101 directed to intercepting the event associated with an objected generated by the dedicated creator application program. The relay application program further has a second program portion 1103 directed to forward the intercepted event to the preferred processing application program. Memory 1100 further includes, in a second region 1104, a selection application program 26 for selecting the preferred processing application program. The memory 1100 further stores in a third region 1106 an installation application program for installing the relay application program and the selection application program. Furthermore, the memory 1100 stores in a fourth region 1108 a remover application programmed for de-installing the relay and selection application programs. In addition, the memory 1100 stores in a fifth region 1110 an operating system program. The operating system program performs the customary functions that operating systems perform in computer systems. In addition, the operating system shown in FIG. 11 is responsible for activating or launching the relay application program stored in the first region.

As explained above, the present invention can be implemented in special purpose hardware devices, such as discrete logic devices, large scale integrated circuits (LSI's), and application-specific integrated circuits (ASIC's). In such a computer system, the applications of the present invention could be implemented in hardware modules coupled to each other as shown in FIGS. 3, 4, and 9.

In the foregoing specification, the invention has been described with reference to specific embodiments thereof. It win however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A computer-related method for processing events said method comprising:

receiving an event associated with an object generated by a dedicated creator electronic mail application program, said dedicated creator electronic mail application program having a dedicated identifier;

changing said dedicated identifier of said dedicated creator electronic mail processing application to an identifier different from said dedicated identifier;

intercepting said event with a relay application program, said relay application program having associated therewith said dedicated identifier; and forwarding, with said relay application program, said intercepted event to a preferred electronic mail processing application program that has a preferred identifier.

2. The computer-related method of claim 1 wherein forwarding said intercepted event includes:

identifying said preferred processing application;

launching said preferred processing application; and sending said event to said preferred processing application program.

3. The computer-related method of claim 1 further including the preliminary acts of:

installing said relay application program;

installing a selection application program; and selecting, with said selection application program, said preferred processing application program, wherein the preliminary are performed prior to the acted recited in claim 1.

4. The computer-related method of claim 3 wherein said dedicated identifier corresponds to a first creator type of said dedicated processing application program.

5. The computer-related method of claim 4 wherein said preferred identifier corresponds to a second creator type of said preferred processing application program.

6. The computer-related method of claim 5 wherein installing said relay application comprises:

receiving an install command;

scanning local drives for all applications having said first creator type;

changing the creator type of all applications having said first creator type to a third creator type;

placing said relay application in condition for launching at a predetermined time; and providing user accessibility to said selection application program via a selection graphic user interface (GUI).

7. The computer-related method of claim 6 wherein said predetermined time is the system initialization time.

8. The computer-related method of claim 6 wherein placing said relay application in condition for launching comprises placing said relay applications into a first location of a memory.

9. The computer-related method of claim 6 wherein providing user accessibility to said selection application via said GUI comprises placing said selection application into a second location of said memory.

* * * * *